United States Patent [19]
Bonifay et al.

[11] Patent Number: 5,773,379
[45] Date of Patent: Jun. 30, 1998

[54] THERMAL REGULATION PROCESS FOR A SOLID IN A HEAT EXCHANGER USING CYLINDRICAL TUBE SURFACES

[75] Inventors: Régis Bonifay, Asnieres; Thierry Gauthier, Saint Genis Laval; Renaud Pontier, Vienne; Frédéric Hoffmann, Paris, all of France

[73] Assignee: Institut Francais Du Petrole, Rueil Malmaison, France

[21] Appl. No.: 545,870

[22] PCT Filed: May 4, 1994

[86] PCT No.: PCT/FR94/00522

§ 371 Date: Nov. 13, 1995

§ 102(e) Date: Nov. 13, 1995

[87] PCT Pub. No.: WO94/26845

PCT Pub. Date: Nov. 24, 1994

[30] Foreign Application Priority Data

May 10, 1993 [FR] France .................................. 9305685

[51] Int. Cl.⁶ .................................................. B01J 20/34
[52] U.S. Cl. .............................. 502/44; 502/41; 208/113; 208/160
[58] Field of Search ........................ 502/44, 41; 208/160, 208/113

[56] References Cited

U.S. PATENT DOCUMENTS

| | | | |
|---|---|---|---|
| 2,963,422 | 12/1960 | Hann ....................................... | 208/160 |
| 4,422,302 | 12/1983 | Davis et al. .............................. | 62/57 |
| 4,434,245 | 2/1984 | Lomas et al. .............................. | 502/2 |
| 4,439,533 | 3/1984 | Lomas et al. ............................. | 502/41 |
| 4,471,063 | 9/1984 | Hettinger ................................. | 502/40 |
| 4,753,907 | 6/1988 | Zandona et al. .......................... | 502/44 |
| 4,757,039 | 7/1988 | Lomas ...................................... | 502/44 |
| 4,964,523 | 10/1990 | Mauleon et al. .......................... | 502/44 |
| 5,120,691 | 6/1992 | Pontier et al. ............................ | 502/44 |
| 5,286,690 | 2/1994 | Hoffmann et al. ........................ | 502/44 |

FOREIGN PATENT DOCUMENTS

| | | |
|---|---|---|
| 0092065 | 10/1983 | European Pat. Off. . |
| 0153214 | 8/1985 | European Pat. Off. . |
| 0192906 | 9/1986 | European Pat. Off. . |
| 0197486 | 10/1986 | European Pat. Off. . |
| 0403381 | 12/1990 | European Pat. Off. . |
| 0093063 | 11/1993 | European Pat. Off. . |
| 2015263 | 4/1970 | France . |
| 2124043 | 9/1972 | France . |
| 3305471 | 8/1983 | Germany . |

Primary Examiner—Walter D. Griffin
Attorney, Agent, or Firm—Millen, White, Zelano, & Branigan, P.C.

[57] ABSTRACT

The invention concerns a process for thermal regulation in a continuous fluidized bed treatment process for a powdered solid, wherein the solid is treated in a fluidized bed treatment zone, at least a portion of the solid is extracted from said zone and transported to an external heat exchanger (21) containing at least one array (22) of thermal exchange tubes in which vaporizable cooling fluid circulates, fluidized or mobile bed thermal regulation by indirect heat exchange with the fluid is carried out and the portion of regulated solid is extracted for recycling into the treatment zone or to another treatment zone (1). More precisely, said portion of solid is circulated in descending mode by means of an inert or non inert fluidization fluid across the array of tubes (22) which are wound such that the current of solid intersects said tubes and that the cooling fluid is circulated in one direction in the array of tubes.

14 Claims, 1 Drawing Sheet

THERMAL REGULATION PROCESS FOR A SOLID IN A HEAT EXCHANGER USING CYLINDRICAL TUBE SURFACES

FIELD OF THE INVENTION

The invention concerns the use of an array of specially wound tubes in a fluidised or mobile bed heat exchanger. It generally concerns a process for thermal regulation or control in a continuous fluidised or mobile bed treatment process for powdered solid. The invention particularly concerns a process for regeneration of a used catalyst by heat exchange in a fluidised bed. The process is particularly applicable to the regeneration of catalysts which are particularly heavily loaded with hydrocarbon residues and coke following reaction with a hydrocarbon feedstock. It can apply to catalysts for hydrotreatment, hydrocracking or catalytic cracking, reforming catalysts or to any contact mass used, for example, in thermal cracking processes.

By way of illustration, we shall describe the use of an array of tubes in a fluidised bed process for regeneration of a used catalyst from a catalytic cracking process using heavy feedstocks having a high Conradson carbon residue such as atmospheric pressure residue, vacuum residue, or deasphalted residue, these residues being capable of hydrotreatment.

The process is particularly applicable to temperature control.

BACKGROUND OF THE INVENTION

Catalytic cracking processes convert hydrocarbon feedstocks into lighter products such as petrol. The feedstocks were initially fairly light, for example gas oils, and in order to achieve maximum conversion efficiency using highly active zeolite catalysts, it was necessary to remove the maximum amount of coke which deposited on these catalysts and reduced their activity. This was carried out in a regeneration step at a temperature of between 520° C. and 800° C.

Increasing demand for fuels led refiners to use heavier and heavier feedstocks, containing high boiling point hydrocarbons, with boiling points of more than 550° C., for example, and a high Conradson carbon residue or high concentration of metals. Large quantities of coke and heavy hydrocarbons can become deposited on the catalyst during the catalytic cracking phase. Combustion regeneration releases a large amount of heat which can cause the apparatus to deteriorate and deactivate the catalyst, particularly when exposed to temperatures of greater than 800° C. for long periods. It is therefore essential to control catalyst regeneration. This problem is particularly prominent when existing technology essentially designed for the treatment of conventional feedstocks is employed in a process using much heavier feedstocks.

The following patent documents illustrate the state of the art: EP-A-0 092 065, U.S. Pat. No. 2,963,422, EP-A-0 197 486, EP-A-0 153 214, EP-A-192 906 and EP-A-0 093 063. In addition, European patent EP-A-0 403 381 describes a double chamber heat exchanger connected to a catalyst regenerator by a single entrance and exit opening, which limits the cooling efficiency of the exchanger.

The prior art is further illustrated by U.S. Pat. No. 4,434,245 which describes thermal exchange of a catalyst which has been removed from a release zone located above a combustion zone and comprising vertical bayonet tubes. The drawback here is that a limiting layer of defluidised catalyst located at the tube walls flows along the tube and reduces thermal exchange.

Complex and cumbersome technology is usually required to overcome this problem, thereby reducing the reliability of the system.

A horizontal tubular plate positioned in the thermal exchanger and supporting the tubes will maintain the mechanical integrity of the assembly. However, widely different temperature and pressure conditions in different parts of the plate, for example 730° C., 3 bars on the catalyst side and 275° C., 60 bars on the coolant water side, create intense stresses which affect the mechanical integrity of the assembly.

SUMMARY OF THE INVENTION

One object of the invention is to overcome the problems associated with the prior art and obtain maximal thermal exchange in the most homogeneous fashion.

The invention thus concerns a process for thermal regulation or control in a continuous fluidised or mobile bed treatment process for a powdered solid, wherein the solid is treated in a fluidised or mobile bed treatment zone, at least a portion of the solid is extracted from said zone and transported to an external thermal regulation or control zone which is advantageously elongate and has an axis of symmetry and which contains at least one array of thermal exchange tubes in which vaporisable cooling fluid circulates, fluidised or mobile bed thermal regulation by indirect heat exchange with the fluid is carried out and the regulated portion of solid is extracted for recycling into said treatment zone or to another treatment zone. More precisely, said portion of solid is circulated in descending mode by means of an inert or non inert fluidisation fluid across the array of tubes which are wound or disposed such that the current of solid intersects said tubes, preferably across substantially the entire cross section of the regulation zone, and such that the cooling fluid is circulated in one direction in the array of tubes.

In a first preferred embodiment of the process, the thermal exchange array comprises tubes wound into a helix with a plurality of diameters with respect to a winding axis which is substantially parallel to the axis of symmetry of the regulation zone, such that tubes having the same winding diameter form a cylindrical layer or surface and that the different layers or surfaces thus formed are disposed one inside the other, preferably substantially concentrically.

This configuration is described in French patent FR-A-2 124 043 as applied to steam generators which are reheated with liquid sodium. Within the context of the invention, this configuration produces maximum exchange in the fluidised bed since substantially the entire volume of the cylindrical thermal exchanger containing the dense phase solid is cooled by the array of tubes.

In a second embodiment, the thermal regulation zone comprises a plurality of tubular arrays comprising a first series of substantially parallel tube sections whose axes are located in a first plane and a second series of substantially parallel tube sections whose axes are located in a second plane which is substantially parallel to the first plane, the sections in one plane being at a substantially equal and opposite inclination to that of the sections in the other plane with respect to the longitudinal plane containing said axis of symmetry, the tube sections with adjacent ends on one side being connected together by bent sections, the assembly of tubular arrays being positioned substantially parallel to the plane containing the axis of symmetry of the thermal regulation zone.

Such a configuration is described in French patent FR-A 2 015 263.

In a third embodiment, the thermal regulation zone comprises a plurality of tube arrays wherein each tube comprises tube sections which are substantially parallel to each other and located in the same plane, the ends adjacent to one side of two successive sections being connected together by bent sections, the assembly of tube arrays being positioned substantially parallel to the plane containing the axis of symmetry of the thermal regulation zone.

These tube arrays may advantageously be used in a process for continuous fluidised bed regeneration of a used catalyst by combustion of the coke deposited on the catalyst during the course of a hydrocarbon conversion reaction in a reaction zone. The process thus comprises at least one regeneration zone into which said catalyst is introduced from said reaction zone, the catalyst is normally regenerated in a dense fluidised bed zone in the presence of a gas containing oxygen under regeneration conditions, at least a portion of the catalyst is extracted from the dense fluidised bed and transported to the thermal regulation or exchange zone, said portion of catalyst is cooled by indirect heat exchange with the cooling fluid, and the cooled portion of catalyst is reintroduced into the dense fluidised bed in the regeneration zone.

In accordance with one mode of operation, the cooled catalyst in the lower portion of the thermal exchange zone is recycled to the dense bed of the generator from which it was extracted by means of co-current injection of fluidisation gas containing oxygen. The cooled catalyst is thus circulated to the regenerator in broadly ascending mode using recycling means comprising a catalyst evacuation conduit controlled by a valve connected to a Y or J junction, for example, which is itself connected to a catalyst gas lift which has fluidisation air injected at its base.

A further mode of operation employing an array is used in a continuous fluidised bed regeneration process for a used catalyst by combustion of coke deposited thereon, comprising two regeneration zones. A first catalyst regeneration step is carried out in a first regeneration zone, the at least partially regenerated catalyst is transported to a second regeneration zone located above the first zone, a second regeneration step is carried out and at least a portion of the catalyst from the second regeneration zone is cooled under the conditions described above and the cooled catalyst is extracted for transport to the first regeneration zone or return to the second regeneration zone.

If the catalyst is recycled to the first regeneration zone, it can be gravity fed (descending mode).

When the catalyst is recycled to the first regeneration zone, it can be recycled in generally ascending mode using the recycling means described above comprising the gas lift.

When recycling to the second regeneration zone, the catalyst can be recycled using the recycling means described above comprising the gas lift.

In a further mode of operating an apparatus comprising two regeneration zones, the first catalyst regeneration step is carried out in the first regeneration zone, at least a portion of the catalyst from the first regeneration zone is cooled in a thermal exchanger in accordance with the invention and the cooled catalyst is recycled to the first regeneration zone using the recycling means described above comprising the gas lift. The catalyst is then transported from the first regeneration zone to the second which is located above the first zone.

Whatever the winding of the tube array described above, the interaxial distance between the tubes defining the helical pitch is between 1.5 and 10 times their diameter, preferably between 2 and 3 times their diameter. This distance can be that measured between tubes located in the same cylindrical surface or between two neighbouring cylindrical surfaces (in the case of the first embodiment). This distance may also be that measured for tubes positioned in accordance with the second and third embodiments.

Good thermal exchange is obtained with a fluidisation gas flow rate of generally 0.01 m/s to 0.75 m/s, preferably 0.05 m/s to 0.3 m/s in the thermal exchange zone using a tube array wherein the cooling fluid and the vapour generated preferably circulates from the bottom to the top at a flow rate normally between 0.5 and 2.5 m/s, for example, preferably 1 to 2 m/s, ie counter-current to the flow of catalyst in the thermal exchange zone.

The catalyst current intersecting the tubes is permanently renewed at the tube surface within its descending current.

High compactness (for example 13 to 16 $m^2/m^3$ of exchanger) and ease of installation or removal are particular advantages.

Further, the tube array can advantageously absorb radial and axial expansions.

Finally, because of the high exchange efficiency, the system requires an installed surface area per unit volume which is less than that of the prior art. This has the advantage of leaving a greater volume for the circulating catalyst, thus retaining good fluidisation without the need for auxiliary means.

The cooling fluid circulating in the exchanger may be air, water, water vapour or mixtures of these fluids.

The catalyst which has been regenerated in accordance with the invention is also of conventional type, such as zeolite or amorphous type aluminosilicates, advantageously with a granulometry of 30 to 100 micrometres.

BRIEF DESCRIPTION OF DRAWINGS

The invention will be better understood from the description of the FIGURE, an elevational view, which illustrates the process and apparatus.

DETAILED DESCRIPTION

Figure 1:
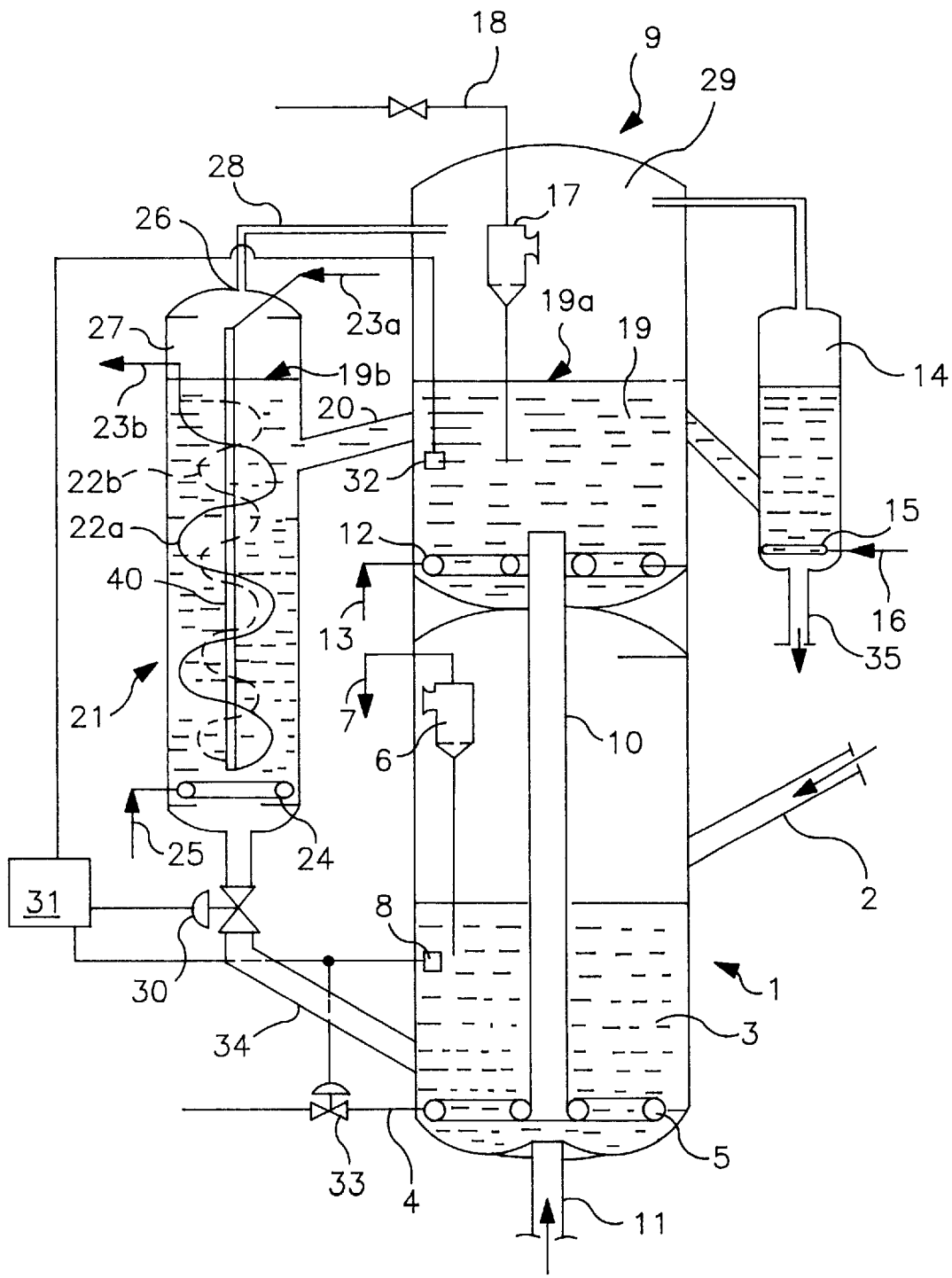

A first regenerator 1 in a catalytic cracking unit receives catalyst on which coke has been deposited during the course of the catalytic cracking reaction from a stripper (not shown) via line 2. This line opens into the catalytic bed at an appropriate point, preferably into the diluted phase located above dense fluidised bed 3. Regeneration gas containing oxygen is fed via line 4 to fluidisation means 5, for example a screen, ring or distribution line, situated at the base of the regenerator to fluidise the dense catalyst bed and effect continuous counter-current combustion of about 50% to 90% of the coke. Regeneration fumes and entrained catalyst are separated in cyclones 6 and the regeneration fumes containing the major combustion products carbon monoxide, carbon dioxide and water vapour are evacuated via line 7 to an incinerator.

The temperature of fluidised bed 3 is measured by means of sensor 8. When this temperature falls below a set value $T_1$, due to introduction of the relatively cold catalyst via lines 34 as will be described below, the flow of oxidising fluid (fluidisation fluid) to fluidisation means 5, regulated by control valve 33 on line 4, is increased until the temperature measured at 8 returns to the preset value.

The partially regenerated catalyst particles are then transferred to a second regenerator 9 located above the first regenerator 1 via conduit 10 which is supplied with air via line 11. Diffuser 12, supplied with air via line 13, is located at the base of the second regenerator. Combustion of the partially regenerated catalyst is carried out in dense bed 19 whose upper portion defines level 19a at a height which depends on the level of aeration.

A portion of the regenerated catalyst is laterally evacuated into buffer chamber 14. Particle fluidisation in this chamber is normally controlled by annular diffuser 15 which is fed with fluidisation gas such as air or an inert gas via line 16. Regenerated catalyst particles are recycled from chamber 14 via conduit 35 fed by a riser (not shown) in a quantity which is determined by the opening or closing of a valve. The combustion gases in the upper portion of the second regenerator are separated from the catalyst particles by external cyclones 17 and evacuated via line 18 which is separate from fume evacuation line 7 from the first regeneration step.

A portion of the hot catalyst and a portion of the fumes at a temperature of 600° to 850° C. are removed from dense bed 19 of the second regenerator at a point located above air injection means 12 and gravity fed via downwardly inclined conduit 20, for example at an angle of 30 to 60 degrees with respect to the axis of the exchanger, into heat exchanger 21 adapted for indirect heat exchange. The exchanger is vertical, of elongate cylindrical form, and contains a thermal exchange array which lines the space containing substantially all the dense catalyst bed, within an envelope. The array is a tubular array composed of a plurality of tubes 22a, 22b wound in a helix with a plurality of diameters with respect to the vertical axis of the exchanger envelope. Layers with the same winding diameter form a cylindrical layer or surface and the various coaxial cylinders thus defined are located one within the other. The chamber which is delimited by the envelope contains the catalyst which is maintained as a dense bed through the tube array by means of fluidisation means 24 (ring or screen) into which a counter-current of air is introduced via line 25. The catalyst circulates from top to bottom through the array, intersecting the tubes across substantially the entire cross section of the exchanger and giving up its heat to an appropriate fluid such as pressurised water which is fed via line 23a. This line feeds the upper extremity of a central cylindrical conduit 40 which is thermally insulated and which acts as the winding axis for the helically disposed tubes and also acts as a stiffener and therefore as a support system. This axial cylindrical conduit, where practically no thermal exchange occurs, feeds the various cylindrical tubular surfaces at different distances from its lower end such that the water-vapour mixture rises counter-current to the catalyst. Thus the helixes with the greatest winding diameter are fed by the ends of bent tubes connected to the lowest points of the axial conduit while those with a smaller diameter are connected higher up.

The upper part of the tubes of the array have ends which are bent vertically to connect to the tube surfaces of the steam chests or toric collectors (not shown), resulting in very high mechanical strength. The water-vapour mixture is evacuated via line 23b connected to the collectors.

Conduit 20 carrying hot catalyst opens into the exchanger at a junction point located below level 19a of the dense bed of the second regenerator, for example at a point located at a distance of a quarter to a third of the height of the exchanger from upper extremity 26. The catalyst is in a dense fluidised bed due to fluidisation means 24 (ring) right across the tube array to a level 19b above the junction point and substantially identical to level 19a of the dense bed in regenerator 29. Level 19b is in general a function of the respective fluidisation flow rates in the second regenerator and in the thermal exchanger and thus of the respective densities. There may thus be a small difference between the catalyst levels in the regenerator and in the exchanger.

The height of the exchange array and the parameters which determine its compactness are generally calculated so that the array occupies substantially the entire volume of the dense bed in the exchanger. Preferably, the height is equal to the highest level which the dense bed in the exchanger can attain, taking into account the differences in pressure which may exist in the exchange zone and in the regenerator.

The height of the exchanger is selected so that, with respect to the level in the regenerator, a 1 to 2.5 m high free zone termed the release zone 27 is created in the exchanger above the dense bed to allow the fluidisation gas and any regeneration fumes to be separated from the catalyst. A degassing line 28 evacuates the fumes and gases from the dilute phase at the upper extremity of the exchanger and carries them to the diluted fluidised phase 29 above the dense fluidised bed of the second regenerator. The diameter is selected so that the ratio of the diameter of the degassing line to that of the catalyst inlet conduit 20 is between 3 and 6. The gas exit rate is generally between 3 and 15 m/s.

Extraction and recycling means 34 comprises a conduit in which the catalyst flows under gravity and which is the first regenerator. The catalyst is transported by a lift recycled into the dense phase of the first regenerator, preferably above fluidisation means 5.

Valve 30, for example a slide gate, is located at the exit to exchanger 21 below the lower extremity of the first regenerator and upstream of the lift. This controls the rate of transfer of catalyst between the regenerators once the temperature of the regenerated catalyst exceeds the required preset value.

The FIGURE is shown with a descending catalyst flow at the exit of the exchanger and with an ascending flow only in the first regenerator. In a further unillustrated embodiment, the catalyst is introduced directly into the dense phase of the first regenerator by descending flow.

The rate of catalyst flow through the thermal exchanger is adjusted to maintain the temperature in the second regenerator and thus maintain the entry temperature into the reaction zone (riser) at a set temperature suitable for the feedstock to be cracked in the unit.

Thermal control of the regeneration process is effected by a combination of the following means:

Automatic control means 31 is connected to valve 30 located on catalyst evacuation conduit 17 from the exchanger. This means is also connected to temperature sensor 32 which monitors the local temperature in the dense bed of second regenerator 9. When the signal transmitted by the sensor indicates a value which exceeds a preselected value which depends on the regeneration parameters and is stored in the automatic control means, a signal is transmitted by the latter to valve 30 which increases the catalyst evacuation flow rate and thus increases the catalyst flow rate into the exchanger. This increase in flow rate helps to reduce the temperature of the first regeneration step as recorded by temperature sensor 8. Means 31 compensates by increasing the oxygen feed by adjusting valve 33 on line 4 which feeds the fluidisation means of the first regenerator. A larger amount of coke can thus be burned off.

If, however, the signal transmitted by sensor 32 indicates a value which is lower than the set value, valve 30 is partially closed to reduce thermal exchange. At the same time, the oxygen consumption in the first regenerator is decreased and thus less coke is burned off, boosting the catalyst temperature in the second regenerator. The temperature is thus maintained at a substantially constant value across a range of desired values.

We claim:

1. A process for thermal regulation or control in a continuous fluidized bed regeneration process for a used catalyst containing coke, comprising regenerating the catalyst in at least one dense fluidized bed regeneration zone;

extracting at least a portion of said catalyst from said zone;

transporting said portion of catalyst in the regeneration zone and a portion of regeneration fumes by a downwardly inclined conduit to an external thermal exchange zone, having an axis of symmetry, an upper extremity and a lower extremity, and containing at least one thermal exchange tube array wherein a vaporizable cooling fluid circulates, said conduit connecting the dense bed of the regeneration zone to the thermal exchange zone and opening thereinto at a junction point located under the level of the dense bed of the regeneration zone and so disposed to provide a dense bed zone of catalyst bounded by the lower extremity of the thermal exchange zone to above the junction point, the upper level of said zone being established substantially to the level of the catalyst in the regeneration zone;

providing a release zone open volume above said dense bed to the upper extremity of the exchange zone;

cooling the catalyst in said dense bed thermal exchange zone under indirect thermal exchange conditions and with fluidization, in the presence of a fluidization gas;

circulating the catalyst downwards counter-currently to the fluidization gas flow direction, and separating the catalyst from the fluidization gas and any regeneration fumes in said release zone volume;

evacuating said gases and fumes from the release zone and transporting the resultant evacuated gases to a dilute phase above the dense bed in the regeneration zone; and recycling the resultant cooled catalyst from the lower portion of the thermal exchange zone to the regeneration zone, the process being characterized in that said tube array is wound or disposed so that the portion of catalyst which is circulated across the tube array in the fluidized bed in a descending mode by means of the fluidization gas intersects said tubes over the cross section of the exchange zone, the lower end of said tube array being connected to an axial conduit for transporting the cooling fluid and maintaining said array.

2. A process according to claim 1 wherein said array comprises tubes wound into a helix with a plurality of helix diameters with respect to a winding axis which is substantially parallel to the axis of symmetry of the exchange zone, such that tubes having the same winding diameter form a cylindrical layer or surface and that the different cylindrical layers or surfaces thus formed are disposed one inside the other.

3. A process according to claim 1, wherein the exchange zone comprises a plurality of tubular arrays comprising a first series of substantially parallel tube sections whose axes are located in a first plane and a second series of substantially parallel tube sections whose axes are located in a second plane which is substantially parallel to the first plane, the sections in one plane being at a substantially equal and opposite inclination to that of the sections in the other plane with respect to the longitudinal plane containing said axis of symmetry, the tube sections with ends adjacent to one side being connected together by bent sections, the assembly of tubular arrays being positioned substantially parallel to the plane containing the axis of symmetry of the thermal regulation zone.

4. A process according to claim 1, wherein the exchange zone comprises a plurality of tube arrays wherein each tube comprises tube sections which are substantially parallel to each other and located in the same plane, the ends adjacent to one side of two successive sections being connected together by bent sections, the assembly of tube arrays being positioned substantially parallel to the plane containing the axis of symmetry of the thermal regulation zone.

5. A process according to claim 1, comprising two used-catalyst regeneration zones, conducting a first catalyst regeneration step in a first regeneration zone to produce an at least partially regenerated catalyst, transporting the latter to a second regeneration zone located above the first zone, conducting a second regeneration step and cooling at least a portion of the catalyst from the second regeneration zone in accordance with claim 1 and extracting the cooled catalyst from the exchange zone for transport to the first regeneration zone or return to the second regeneration zone.

6. A process according to claim 1, wherein said tubes are in the form off a helix having an interaxial distance between the tubes of 1.5 to 10 times the diameter of the tubes.

7. A process according to claim 1, wherein the thermal exchange array occupies substantially the entire volume of the dense bed in the thermal exchange zone.

8. A process according to claim 1 wherein the flow rate of the cooling fluid in the tubes is 0.5 to 2.5 m/s.

9. A process according to claim 1 wherein the cooling fluid circulates in the tubes from bottom to top.

10. A process according to claim 1, wherein the flow rate of the fluidisation gas in the thermal exchange zone is 0.01 m/s to 0.75 m/s.

11. A process according to claim 6, wherein the interaxial distance between the tubes is 2 to 3 times the diameter of the tubes.

12. A process according to claim 10, wherein the flow rate is 0.05 m/s to 0.3 m/s.

13. A process according to claim 1, wherein the exchange zone is an elongate zone.

14. A process according to claim 1, wherein the fluidization gas intersects said tubes over substantially the entire cross section of the exchange zone.

* * * * *